(12) United States Patent
George

(10) Patent No.: US 7,210,321 B2
(45) Date of Patent: May 1, 2007

(54) METHOD AND APPARATUS FOR MEASURING CENTERLINE RUNOUT AND OUT OF ROUNDNESS OF A SHAFT

(75) Inventor: Ian M. George, Mulgrave (AU)

(73) Assignee: Dana Australia Pty Ltd., Hallam (AU)

( * ) Notice: Subject to any disclaimer, the term of this patent is extended or adjusted under 35 U.S.C. 154(b) by 384 days.

(21) Appl. No.: 10/845,478

(22) Filed: May 14, 2004

(65) Prior Publication Data

US 2004/0226336 A1    Nov. 18, 2004

(51) Int. Cl.
*G01B 11/06* (2006.01)
*B21D 3/16* (2006.01)
*B21D 7/06* (2006.01)
*G01N 21/86* (2006.01)

(52) U.S. Cl. ............ 72/31.03; 72/389.1; 356/384; 356/638; 250/559.23; 73/622; 29/33 T

(58) Field of Classification Search .......... 72/389.1, 72/389.2, 389.3, 390.3, 31.03; 356/384, 356/638; 250/559.23; 73/622; 29/33 T
See application file for complete search history.

(56) References Cited

U.S. PATENT DOCUMENTS

| | | | |
|---|---|---|---|
| 3,658,428 A | 4/1972 | Voighaender-Tetzner | |
| 3,949,588 A * | 4/1976 | Seo | ............... 72/389.6 |
| 4,074,938 A | 2/1978 | Taylor | |
| 4,122,525 A | 10/1978 | Eaton | |
| 4,417,147 A * | 11/1983 | Faville | ........... 250/559.14 |
| 4,700,439 A * | 10/1987 | Hines | ............... 72/386 |
| 4,875,776 A | 10/1989 | Pryor | |
| 4,978,223 A | 12/1990 | Kutchenriter et al. | |
| 5,114,230 A | 5/1992 | Pryor | |
| 5,140,534 A * | 8/1992 | Miller et al. | ........... 700/279 |
| 5,253,499 A * | 10/1993 | Knipp et al. | ........... 72/31.05 |
| 5,747,693 A * | 5/1998 | Abbate et al. | ........... 73/622 |
| 5,839,315 A * | 11/1998 | Kubik | ........... 72/389.1 |
| 6,091,500 A | 7/2000 | Bahr et al. | |
| 6,393,890 B1 * | 5/2002 | Scholeck | ........... 72/390.3 |
| 6,519,861 B1 * | 2/2003 | Brueck et al. | ........... 33/507 |
| 6,757,636 B2 * | 6/2004 | Bluestein | ........... 702/155 |
| 7,026,637 B2 * | 4/2006 | Sarr | ........... 250/559.23 |

* cited by examiner

*Primary Examiner*—David Jones
(74) *Attorney, Agent, or Firm*—Berenato, White & Stavish

(57) ABSTRACT

The centreline runout (a) and out of roundness (b) of a shaft (100) is measured by measuring the distance between the central longitudinal axis (102) of the shaft (100) and each of a plurality of angularly spaced measurement points (103) located on the outer surface of the shaft in a measurement plane (18) using a measuring device (10). The position of the centroid (104) of the shaft at the measurement plane (18) is calculated along with the distance between the centroid (104) and the shaft central longitudinal axis (102), providing a centreline runout measurement (a). The distance between each measurement point (103) and the centroid (104) is calculated with these distances being used to calculate an out of round measurement (b).

12 Claims, 4 Drawing Sheets

METHOD AND APPARATUS FOR MEASURING CENTERLINE RUNOUT AND OUT OF ROUNDNESS OF A SHAFT

FIELD OF THE INVENTION

The present invention relates to the dimensional measurement of shafts, and particularly relates to, but is not limited to, the measurement of centreline runout and out of roundness of drive shafts.

BACKGROUND OF THE INVENTION

Motor vehicle drive shafts must be manufactured to close runout tolerances, particularly to avoid vibration and associated component drainage. Runout can result from a bent shaft, referred to as centreline runout (lack of straightness), and/or out of roundness (ovality or lack of circularity) of the shaft cross-section. Whilst a bent shaft can cause vibration, an out of round shaft will not. Excessive out of round will, however, weaken the shaft.

Drive shafts are typically inspected for runout by way of dial gauges or electro-optical measurement systems, measuring total runout of the drive shaft at various transverse cross-sections.

Whilst run out can be caused by either out of roundness or lack of shaft straightness, the current methods are unable to readily distinguish between these two causes or components of run out. The cause of run out is significant as run out caused by lack of shaft straightness can typically be readily rectified by way of a straightening press whereas out of round defects are typically not rectifiable and require rejection of the drive shaft.

OBJECT OF THE INVENTION

It is the object of the present invention to overcome or substantially ameliorate at least one of the above disadvantages.

SUMMARY OF THE INVENTION

There is disclosed herein a method of measuring centreline runout and out of roundness of a shaft, said shaft having a central longitudinal axis extending between the centres of opposing ends of said shaft, said method comprising the steps of:

a) selecting a first measurement plane transverse to said central longitudinal axis;

b) measuring the distance between said central longitudinal axis and each of a plurality of angularly spaced measurement points located on the outer surface of said shaft in said first measurement plane with a measuring means;

c) calculating the position of the centroid of the transverse cross-section of said shaft defined in said first measurement plane based on the distances measured in step b);

d) calculating the distance between said centroid and said central longitudinal axis, thereby providing a centreline runout measurement of said shaft in said first measurement plane;

e) calculating the distance between each said measurement point and said centroid; and f) calculating an out of round measurement of said shaft in said first measurement plane based on the distances measured in step e).

Typically said out of round measurement calculated in step e) is calculated by subtracting the minimum distance calculated in step e), corresponding to the measurement point nearest said centroid, to the maximum distance calculated in step e), corresponding to the measurement point furthest from said centroid.

Preferably, said measuring means is a single measuring device having a measuring axis, said shaft being rotated about said central longitudinal axis between subsequent measurements to coincide the next said measurement point with said measuring axis.

Preferably said measuring device is an optical distance sensor.

Typically, said measuring axis intersects said shaft central longitudinal axis.

Preferably, said method further comprises the step of:

g) comparing said centreline runout measurement and said out of round measurement with predetermined centreline runout and out of round acceptance tolerances for said shaft.

Preferably, if said centreline runout measurement is not within said predetermined centreline runout acceptance tolerance, said method further comprises the step of:

h) applying a transverse load to said shaft in said first measurement plane in a load direction passing through said centroid to said central longitudinal axis, thereby bending said shaft to reduce said centreline runout measurement.

Preferably, prior to step h), said shaft is rotated such that said measuring axis passes through said centroid with said centroid being located on an opposing side of said central longitudinal axis to said measuring device, said load direction being along said measuring axis.

Typically, said transverse load is applied by an hydraulic press arranged opposite said measuring device.

Typically, steps b) through g) are repeated after step h).

Typically, if said centreline runout and out of round measurements are within said predetermined centreline runout and out of round acceptance tolerances, said method further comprises the steps of:

i) selecting a second measurement plane longitudinally spaced from said first measurement plane; and j) longitudinally displacing said shaft with respect to said measuring means to align said second measurement plane with said measuring means.

k) repeating steps b) through g) for said second measurement plane.

Typically, if said centreline runout and out of round measurements for said second measurement plane are within said predetermined centreline runout and out of round acceptance tolerances for said second measurement plane, steps i) through k) are repeated for one or more further longitudinally spaced measurement planes.

There is disclosed herein an apparatus for measuring centreline runout and out of roundness of a shaft, said shaft having a central longitudinal axis extending between the centres of opposing ends of said shaft, said apparatus comprising:

a mounting assembly for mounting said shaft;

means for measuring the distance between said central longitudinal axis and each of a plurality of angularly spaced measurement points located on the outer surface of said shaft in a measurement plane transverse to said central longitudinal axis; and processor means adapted for:

a) calculating the position of the centroid of the transverse cross-section of said shaft defined in said measurement plane based on the distances measured, b) calculating the distance between said centroid and said central longitudinal axis, thereby providing a centreline runout measurement of said shaft in said measurement plane;

c) calculating the distance between each said measurement point and said centroid; and d) calculating an out of round measurement of said shaft in said measurement plane based on the distances calculated in calculation e).

Preferably, said means for measuring comprises a single measuring device having a measuring axis, said apparatus further comprising means for rotating said shaft about said central longitudinal axis between angular orientations at which said measurement points are each coincident with said measuring axis.

Preferably said measuring device is an optical distance sensor.

Typically, said measuring axis intersects said shaft central longitudinal axis.

Preferably, said apparatus further comprises data storage means for storing predetermined centreline runout and out of round acceptance tolerances for said shaft, said processor means being further adapted for comparing said centreline runout measurement and said out of round measurement with said predetermined centreline runout and out of round acceptance tolerances.

Preferably, said apparatus further comprises means for applying a transverse load to said shaft in said measurement plane in a direction passing through said centroid to said central longitudinal axis, thereby bending said shaft to reduce said centreline runout measurement.

Typically, said means for applying a transverse load is an hydraulic press arranged opposite said means for measuring.

Preferably, said shaft is longitudinally displaceable with respect to said means for measuring, thereby enabling measurement in multiple said measurement planes.

Preferably, said apparatus further comprises means for longitudinally displacing said shaft with respect to said means for measuring.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
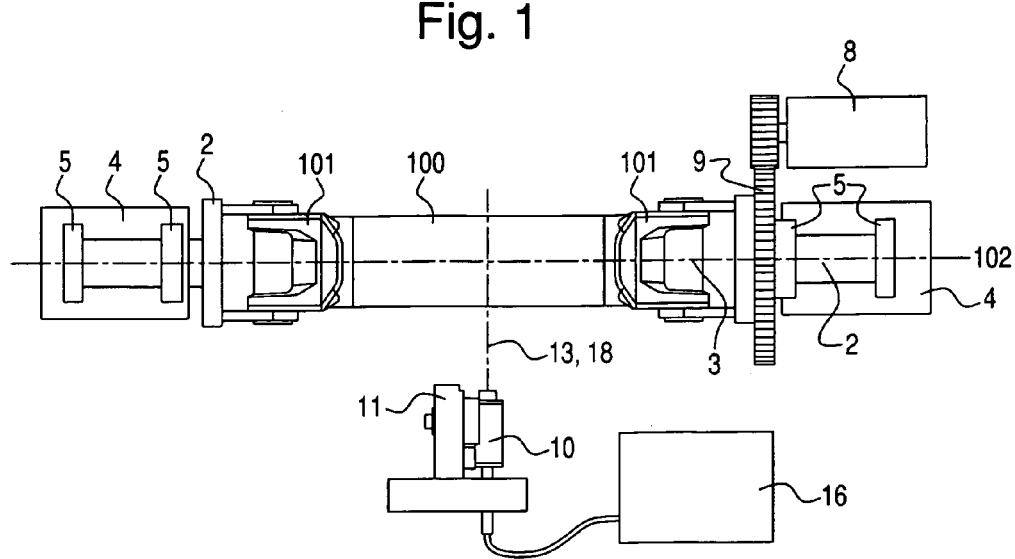
FIG. 1 is a schematic front elevation view of an apparatus for measuring centreline runout and out of roundness of a shaft, particularly depicting the shaft mounting and measuring device.
Figure 2:
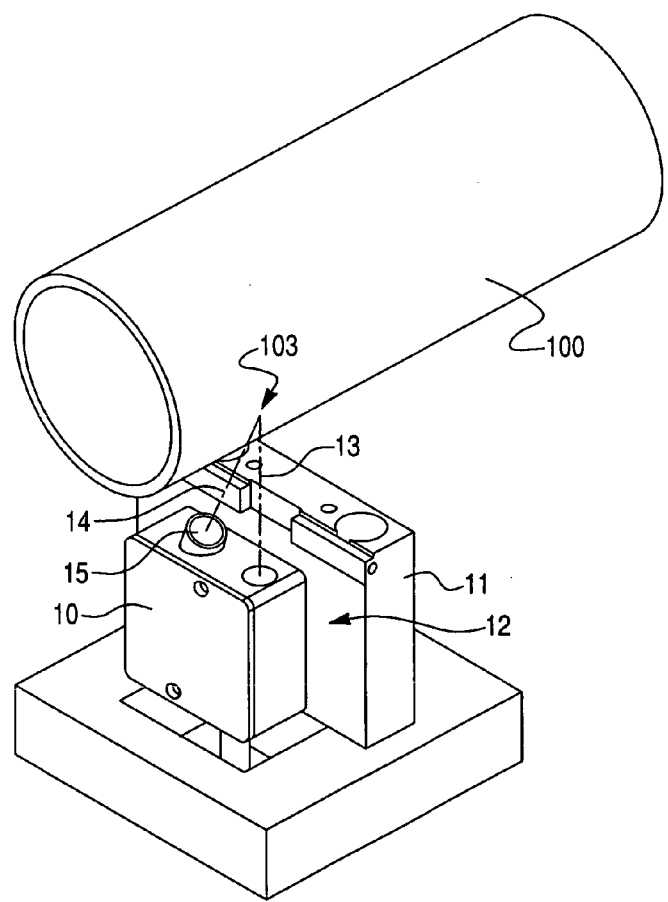
FIG. 2 is an isometric view of the measuring device of the apparatus of FIG. 1.
Figure 3:
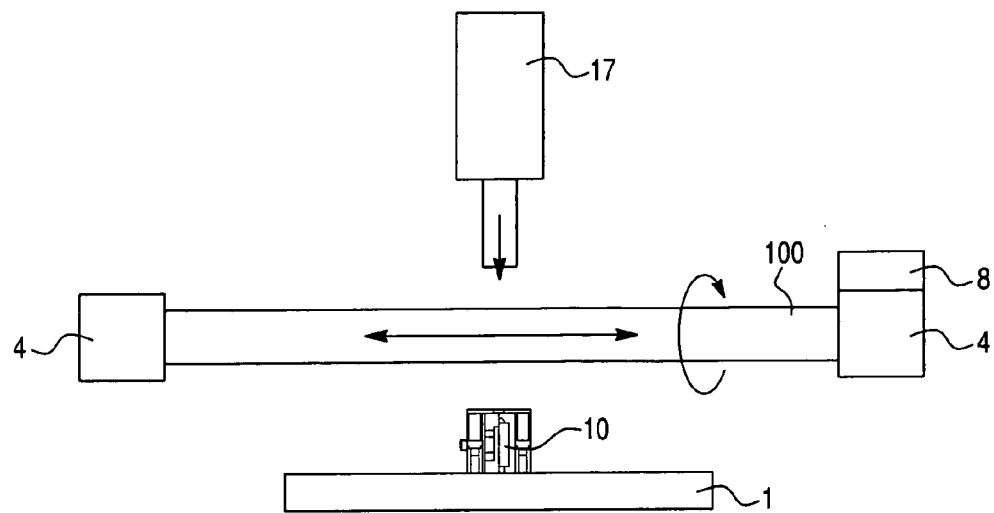
FIG. 3 is a schematic front elevation view of the apparatus of FIG. 1, particularly depicting the location of the measuring device and hydraulic press.
Figure 4:
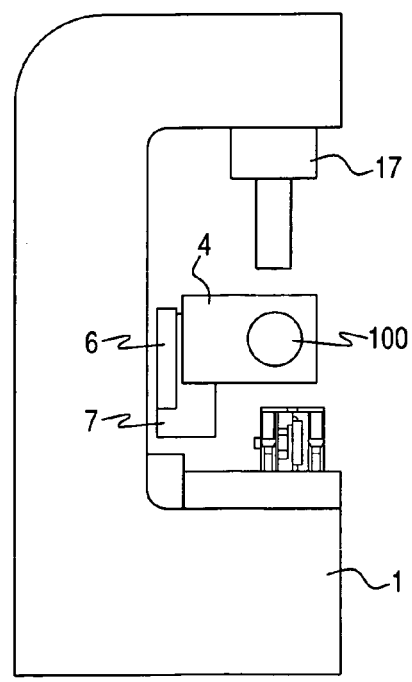
FIG. 4 is a schematic side elevation view of the apparatus of FIG. 3.

Referring specifically to FIGS. 1 to 4, an apparatus for measuring the centreline runout and out of roundness of a shaft has a frame 1 to which is fitted a mounting assembly for mounting a shaft in the form of a drive shaft 100. The mounting assembly includes a spindle 2 at each opposing end of the drive shaft 100, with the drive shaft 100 being connected to the spindles 2 by way of pins 3 passing through each end yoke 101 of the drive shaft 100, as particularly depicted in FIG. 1. The spindles 2 are rotatably mounted within the shaft mounts 4 by way of bearings 5. The shaft mounts 4 are in turn mounted on a guide rail 6 fixed to the frame 1, thereby enabling longitudinal displacement of the shaft 100. The shaft mounts 4 are driven along the guide rail 6 by way of a drive motor 7 so as to longitudinally displace the shaft 100 with respect to the frame 1. Alternatively, the shaft mounts 4 (and shaft 100) may be manually displaced along the guide rail 6.

The shaft 100 is also rotatable by way of a further drive motor 8 driving one of the spindles 2 via a geared drive 9. The shaft 100 is mounted to the mounting assembly in such a manner that it is rotated about a central longitudinal axis 102 extending between the centre of each opposing end of the drive shaft 100. This central longitudinal axis 102 represents the drive axis of the drive shaft 100 about which the drive shaft rotates when in use on a motor vehicle.

A measuring device, in the form of an optical distance sensor 10, is mounted on the frame 1 by way of a mounting block 11 incorporating an adjusting plate 12. The adjusting plate 12 enables the vertical position of the measuring device 10 to be adjusted to compensate for variations in shaft diameter and consequent variations in distance between the measuring device 10 and the shaft 100, ensuring the drive shaft distance is within the measuring range of the measuring device 10. A suitable measuring device used in the preferred embodiment is an MEL series M5 laser sensor, available from MEL Mikroelektronik GmbH of Germany. This sensor operates by emitting a single laser beam along a measuring axis 13 which impacts the work piece to be measured and diffusely reflected light 14 is projected onto a position sensitive device (PSD, not depicted) through a lens 15. The stand off distance of the work piece impacted surface from the sensor 10 is calculated by a triangulation method based on the position that the diffusely impacted light impacts on the PSD.

The sensor 10 is mounted directly beneath the drive shaft 100 such that the measuring axis 13 extends vertically directly through the shaft central longitudinal axis 102. The laser beam thus impacts on a measurement point 103 the lower most point of the outer surface of the drive shaft 100, which is perpendicular to the measuring axis 13. With the distance between the sensor 10 and drive shaft central longitudinal axis 102 being known, a data storage and processing means, in the form of a computer 16 coupled to the output of the measuring device 10, can calculate the distance between the central longitudinal axis 102 and the measurement point 103 on the outer surface of the drive shaft 100 at which the laser beam impacts.

Whilst the particular form of measuring device 10 described is particularly suitable for carrying out the present method, other forms of measurement device which are capable of determining the distance between the outer surface of the drive shaft 100 at a given measurement point and the central longitudinal axis 102 of the drive shaft may be utilised. Such other measuring devices might include mechanical gauges or other forms of optical sensors including optical sensors of the form having a beam or sheet of light passing from one side of the shaft to a receptor on an opposing site of the shaft, with blockage of the passage of light being used to indicate the location of the outer surface of the shaft 100.

The apparatus further includes means for applying a transverse load to the shaft 100 in the form of an hydraulic press 17 mounted on the frame 1. The hydraulic press 17 is configured to apply a load to the shaft in a plane perpendicular to the shaft central longitudinal axis 102. The hydraulic press 17 is here arranged directly opposite the measuring device 10 such that the line of action of the load applied by the press 17 is coaxial with the measuring axis 13 of the measuring device 10. The hydraulic press 17 is effective in laterally deforming a bent drive shaft so as to reduce centreline runout of the drive shaft. Whilst the hydraulic press 17 is arranged on the same frame 1 as that on which the drive shaft 102 is measured, it is envisaged, although less preferred, that rectification procedures utilising such an hydraulic press might be conducted on a separate piece of equipment.

Figure 5:
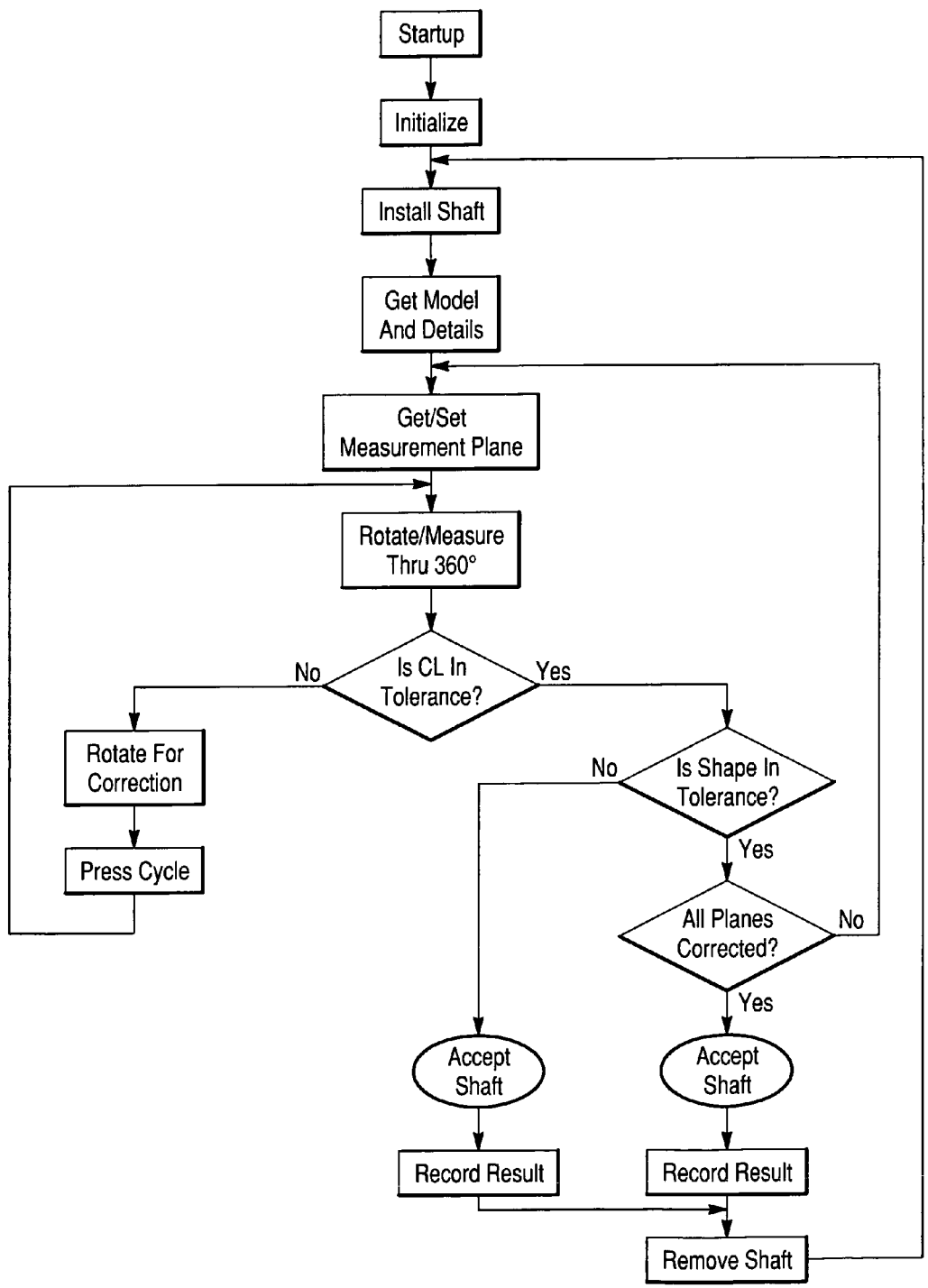
FIG. 5 is a flow chart depicting the steps of a method for measuring centreline runout and out of roundness of a shaft.

The operation of the apparatus to measure the centreline runout and out of roundness of the drive shaft 100 will now be described, with particular reference to the process flow chart of FIG. 5.

Start up and initialising sequences are first conducted through operation of the computer 16. A drive shaft 100 to be measured is then installed on the apparatus by mounting the drive shaft yokes 101 to the mounting assembly spindles 2 utilising mounting pins 3. The model and identification details of the drive shaft 100 to be measured are then entered into the computer 16 by the operator or other means such as barcode. The computer 16 identifies relevant parameters of the drive shaft model, including predetermined centreline runout and out of round acceptance tolerances for the particular model from data stored within the computer 16.

A first measurement plane 18, transverse to the shaft central longitudinal axis 102 is selected. For most drive shafts the centreline runout and out of round acceptance tolerances will be specific to set transverse cross-sections of the drive shaft, and accordingly the first measurement plane will typically be automatically selected by the computer 16 to correspond to one of the planes for which acceptance tolerances have been provided. The drive shaft 100 is then longitudinally displaced (by motor 7 or manually) with respect to the frame 1, and accordingly the measuring device 10, until the first measurement plane 18 coincides with the measuring axis 13.

Figure 6:
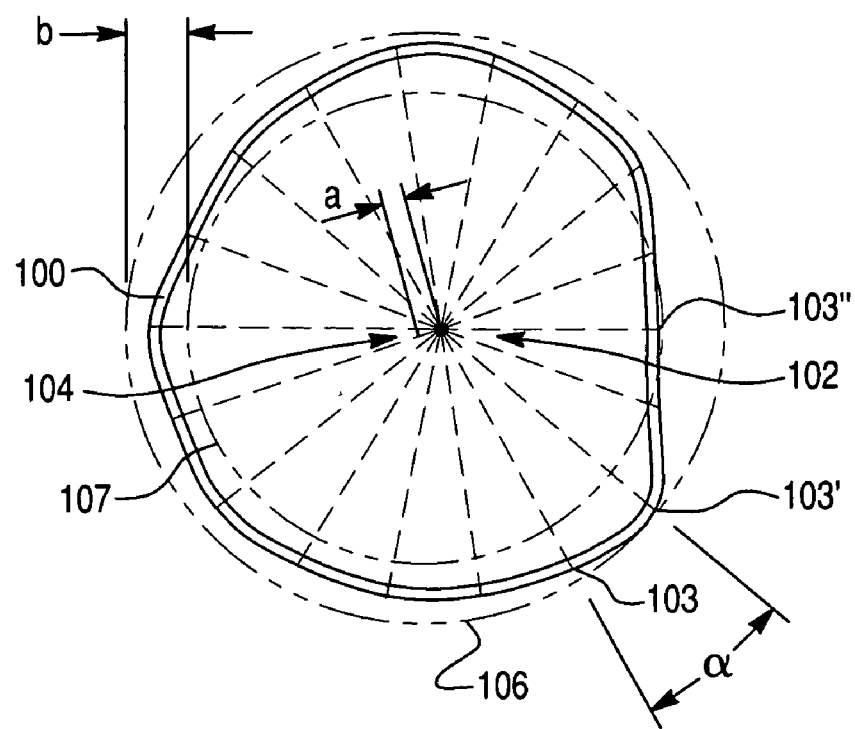
FIG. 6 is a schematic cross-sectional view of a shaft depicting centreline runout and out of roundness characteristics.

The distance between the shaft central longitudinal axis 102 and a first measurement point 103 on the lower outer surface of the drive shaft 100 coincident with the measuring axis 13 is measured by the measuring device 10 and stored in the computer 16. The drive shaft 100 is then rotated through a predetermined angle by way of the drive motor 8 so as to coincide a second measurement point with the measuring axis 13. A measurement is taken at this second measurement point and stored in the computer 16. The drive shaft 100 is further rotated to a series of further measurement points, each equally angularly spaced so as to build up a profile of the outer surface of the drive shaft based on the measured location of each of the measurement points 103 in relation to the shaft central longitudinal axis 102. A representation of such a measured profile is depicted in FIG. 6. The angular displacement α of the drive shaft 100 between successive measurement points 103 may be selected as desired, but in the example depicted an angular displacement α of 20 degrees has been selected so as to provide a profile based on 18 measurement points 103.

Once the drive shaft 100 has been rotated through 360 degrees and measurements at all measurement points 103 taken, the computer calculates the centroid 104 of the cross-section of the shaft 100 defined in the first measurement plane based on the measured location of each of the measurement points 103 in relation to the shaft central longitudinal axis 102. The distance "a" between the centroid 104 and the shaft central longitudinal axis 102 is then calculated with this distance "a" being the centreline runout measurement of the shaft 100 in the first measurement plane 18.

With the location of the centroid 104 now being known, the distance between each of the measurement points 103 and the centroid 104 is calculated. Using these distances, an out of round measurement of the shaft 100 is then determined. Here this out of round measurement is determined by first identifying the measurement point 103' located furthest from the centroid and the measurement point 103" located closest to the centroid 104. Subtracting the distance of this closest measurement point 103" to the centroid 104 from the distance of the furthermost measurement point 103' to the centroid 104 provides the out of round measurement "b". A locus of the furthermost measurement point 103' scribed about the centroid 104 is depicted in FIG. 6 as locus 106, whilst a locus of the closest measurement point 103" to the centroid 104 scribed about the centroid 104 is depicted in FIG. 6 as locus 107.

With the centreline runout measurement "a" and out of round measurement "b" for the first measurement plane 18 having been determined, these values are now compared with the stored acceptance tolerances to determine whether the centreline runout is within tolerance and whether the shape of the cross-section (out of roundness) is within tolerance. The results are displayed on the screen of the computer 16.

If both measurements are within tolerance, the shaft 100 is longitudinally displaced to a second measurement plane and the process of measurement and comparison with the acceptance tolerances for that measurement plane are carried out. If these acceptance tolerances are passed, the process is again repeated for further measurement planes. All results are stored within the computer 16 for further analysis and reporting.

If the out of roundness measurement "b" of the first measurement plane 17 (or any subsequent measurement plane) is outside of the acceptable tolerance, the shaft 100 will typically be rejected without any further measurement being taken, as rectification actions for out of round shafts are typically not viable. If rectification actions are viable, however, then such rectification action will typically be carried out on the shaft in the region of the relevant measurement plane prior to conducting measurement at the next measurement plane.

If the centreline runout measurement "a" is out of the acceptable tolerance at the first measurement plane (or any subsequent measurement plane), corrective action is taken by the hydraulic press 17. With the drive shaft 100 remaining with the relevant measurement plane aligned with the measuring axis 13, the shaft is rotated by way of the drive motor 8 such that the measuring axis 13 passes through the shaft centroid 104, with the centroid 104 located on an opposing side of the central longitudinal axis 102 to the measuring device 13. Accordingly, the shaft 100 is oriented such that the outwardly bowed side directly faces the hydraulic press 17 arranged directly opposite the measuring device 10. A transverse corrective load is then applied to the drive shaft 100 by the hydraulic press 17, thereby bending the shaft 100 to reduce the centreline runout measurement. The load applied may be determined manually or, more preferably, the computer 16 will calculate the required load to straighten the shaft 100. The required corrective load is displayed on the screen of the computer 16.

After corrective action by the hydraulic press 17, measurements are again taken in the relevant measurement plane at all measurement points 103 to confirm that the shaft is now within tolerance. The out of roundness measurement "b" is considered as well as the centreline runout measurement "a" given that loading of the shaft by the hydraulic press 17 may generate a degree of out of roundness.

Once all measurement planes have been measured and the shaft has been found to be within tolerances at all measurement planes, the shaft can be accepted. All results are recorded by the computer 16, and the shaft is subsequently removed from the apparatus, ready for installation of the next shaft.

Whilst the above method and apparatus has been specifically described in relation to a drive shaft, the method and apparatus are equally applicable to measurement of centreline runout and out of roundness of any other type of shaft, be it solid or tubular, including camshafts and crankshafts.

The claims defining the invention are as follows:

1. A method of measuring centreline runout and out of roundness for a shaft, said shaft having a central longitudinal axis extending between the centres of opposing ends of said shaft, said method comprising the steps of:
   a) selecting a first measurement plane transverse to said central longitudinal axis;
   b) measuring the distance between said central longitudinal axis and each of a plurality of angularly spaced measurement points located on the outer surface of said shaft in said first measurement plane with a measuring means;
   c) calculating the position of the centroid of the transverse cross-section of said shaft defined in said first measurement plane based on the distances measured in step b);
   d) calculating the distance between said centroid and said central longitudinal axis, thereby providing a centreline runout measurement of said shaft in said first measurement plane;
   e) calculating the distance between each said measurement point and said centroid; and
   f) calculating an out of round measurement of said shaft in said first measurement plane is based on the distances measured in step e).

2. The method of claim 1, wherein said out of round measurement calculated in step e) is calculated by subtracting the minimum distance calculated in step e), corresponding to the measurement point nearest said centroid, to the maximum distance calculated in step e), corresponding to the measurement point furthest from said centroid.

3. The method of claim 1, wherein said measuring means is a single measuring device having a measuring axis, said shaft being rotated about said central longitudinal axis between subsequent measurements to coincide the next said measurement point with said measuring axis.

4. The method of claim 3, wherein said measuring device is an optical distance sensor.

5. The method of claim 3, wherein said measuring axis intersects said shaft central longitudinal axis.

6. The method of claim 1, further comprising the steps of:
   g) comparing said centreline runout measurement and said out of round measurement with predetermined centreline runout and out of round acceptance tolerances for said shaft.

7. The method of claim 6 wherein, if said centreline runout measurement is not within said predetermined centreline runout acceptance tolerance, said method further comprises the step of:
   h) applying a transverse load to said shaft in said first measurement plane in a load direction passing through said centroid to said central longitudinal axis, thereby bending said shaft to reduce said centreline runout measurement.

8. The method of claim 7 wherein, prior to step h), said shaft is rotated such that said measuring axis passes through said centroid with said centroid being located on an opposing side of said central longitudinal axis to said measuring device, said load direction being along said measuring axis.

9. The method of claim 7, wherein said transverse load is applied by an hydraulic press arranged opposite said measuring device.

10. The method of claim 7, wherein steps b) through g) are repeated after step h).

11. The method of claim 6 wherein, if said centreline runout and out of round measurements are within said predetermined centreline runout and out of round acceptance tolerances, said method further comprises the steps of:
    i) selecting a second measurement plane longitudinally spaced from said first measurement plane; and
    j) longitudinally displacing said shaft with respect to said measuring means to align said second measurement plane with said measuring means.
    k) repeating steps b) through g) for said second measurement plane.

12. The method of claim 11 wherein, if said centreline runout and out of round measurements for said second measurement plane are within said predetermined centreline runout and out of round acceptance tolerances for said second measurement plane, steps i) through k) are repeated for one or more further longitudinally spaced measurement planes.

\* \* \* \* \*